United States Patent
Han et al.

(10) Patent No.: US 9,345,042 B2
(45) Date of Patent: May 17, 2016

(54) DOWNLINK DATA COLLISION AVOIDANCE METHOD, ACCESS POINT AND STATION

(71) Applicant: ZTE CORPORATION, Shenzhen, Guangdong Province (CN)

(72) Inventors: Zhiqiang Han, Shenzhen (CN); Kaiying Lv, Shenzhen (CN); Bo Sun, Shenzhen (CN); Kaibo Tian, Shenzhen (CN); Weimin Xing, Shenzhen (CN); Nan Li, Shenzhen (CN); Dan Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/387,578

(22) PCT Filed: Jan. 22, 2013

(86) PCT No.: PCT/CN2013/070830
§ 371 (c)(1),
(2) Date: Sep. 24, 2014

(87) PCT Pub. No.: WO2013/143355
PCT Pub. Date: Oct. 3, 2013

(65) Prior Publication Data
US 2015/0055577 A1 Feb. 26, 2015

(30) Foreign Application Priority Data
Mar. 26, 2012 (CN) .......................... 2012 1 0082497

(51) Int. Cl.
*H04B 7/00* (2006.01)
*H04W 72/12* (2009.01)
(Continued)

(52) U.S. Cl.
CPC ............ *H04W 72/1257* (2013.01); *H04L 1/00* (2013.01); *H04W 74/0816* (2013.01); *H04W 76/021* (2013.01); *H04W 88/08* (2013.01); *H04W 52/00* (2013.01); *H04W 84/12* (2013.01)

(58) Field of Classification Search
CPC .................... H04W 52/0209; H04W 52/0212; H04W 52/0222
USPC .................. 370/310, 431, 445, 449, 465, 498
See application file for complete search history.

(56) References Cited

U.S. PATENT DOCUMENTS 7,433,670 B2 * 10/2008 Benveniste ........... H04W 48/08
370/318
2005/0213534 A1 9/2005 Benveniste
(Continued)

FOREIGN PATENT DOCUMENTS

CN 1738216 A 2/2006
CN 101150442 A 3/2008
(Continued)

OTHER PUBLICATIONS

Wentink,M. et al., IEEE 802.11-12/0114r0 Low Power Medium Access, Jan. 16, 2012, slides 2-13.
(Continued)

*Primary Examiner* — Dmitry H Levitan
(74) *Attorney, Agent, or Firm* — Ling Wu; Stephan Yang; Ling and Yang Intellectual Property

(57) ABSTRACT

The present document provides a method for avoiding downlink data collision, an Access Point (AP) and a Station (STA). The method for avoiding downlink data collision includes: an AP receiving a radio frame for inquiring whether the AP has a Bufferable Unit (BU) of an STA transmitted by the STA; and after determining that there is a BU of the STA and the BU is larger than a predetermined threshold, the AP exchanging radio frames with the STA to reserve a channel, and transmitting the BU to the STA after succeeding in reserving the channel. The method can guarantee the fairness among various STAs and the reasonable utilization of channel resources, thus avoiding the collision; furthermore, the channel reservation frame transmitted by the AP can reserve a longer period of time, i.e. a plurality of BUs can be transmitted to the STA at a time, thus saving the link overhead.

18 Claims, 2 Drawing Sheets

(51) Int. Cl.
*H04W 88/08* (2009.01)
*H04L 1/00* (2006.01)
*H04W 76/02* (2009.01)
*H04W 74/08* (2009.01)
*H04W 52/00* (2009.01)
*H04W 84/12* (2009.01)

(56) References Cited

U.S. PATENT DOCUMENTS

| | | | |
|---|---|---|---|
| 2005/0249227 A1* | 11/2005 | Wang | H04L 47/10 370/412 |
| 2007/0014268 A1* | 1/2007 | Kim | H04W 74/0816 370/338 |
| 2008/0056298 A1 | 3/2008 | Nakayama | |
| 2010/0238807 A1 | 9/2010 | Xhafa et al. | |
| 2013/0223419 A1* | 8/2013 | Ghosh | H04W 52/0235 370/338 |
| 2013/0235720 A1* | 9/2013 | Wang | H04W 28/0278 370/229 |

FOREIGN PATENT DOCUMENTS

| | | |
|---|---|---|
| EP | 2782402 A1 | 9/2014 |
| EP | 2811790 A1 | 12/2014 |

OTHER PUBLICATIONS

Ghosh, C. et al., IEEE 802.11-12/0328r0 PS-Poll Enhancements, Mar. 12, 2012, slides 2-10.
Doppler, K. et al.,IEEE 802.11-12/0327r0 PS-Poll Immediate ACK Enhancements, Mar. 12, 2012, slides 2-7.
Discussion on TDM approach for In-device coexistence, 3GPP TSG-RAN-WG2#72, Motorola, Jacksonville, U.S.A., Nov. 15-19, 2010, R2-106476.
Power-saving buffered units, IEEE P802.11 Wireless LANs, Intel Corporation, Feb. 8, 2010.

* cited by examiner

DOWNLINK DATA COLLISION AVOIDANCE METHOD, ACCESS POINT AND STATION

TECHNICAL FIELD

The present document relates to the field of wireless communication, and in particular, to a method for avoiding downlink data collision, an access point and a station.

BACKGROUND OF THE RELATED ART

At present, in the field of wireless network, the Wireless Local Area Network (WLAN) develops rapidly, and the application range of the WLAN is increasing. In order to meet various network demands, the Institute of Electrical and Electronic Engineers (IEEE) 802.11 group has issued a series of WLAN technology standards such as 802.11a, 802.11b, 802.11g, 802.11n etc., and subsequently, other task groups are set up, which are committed to develop and design specifications of improvements of the existing 802.11 technology. For example, with the development of the Internet of things, the 802.11 ah task group is set up by the IEEE, and its main task is to modify and enhance a Medium Access Control (MAC) layer and a Physical Layer (PHY) of the WLAN, so as to adapt to demands for networks such as a smart grid, a sensor network, environmental/agricultural monitoring, industrial process automation etc.

In the wireless LAN, an Access Point (AP for short) and multiple Non-AP Stations (STAs for short) associated with the AP constitute a Basic Service Set (BSS for short). Before using the BSS service, the STA must complete authentication and association process with the AP. If the association is successful, the AP allocates an Association Identifier (AID for short) to the STAs. The AID is an identity of the STA in the BSS, i.e., the STA can be distinguished from other STAs in the BSS through the AID, but STAs in different BSSs may use the same AID. At the same time, after multiple BSSs are connected by a Distribution System (DS for short), an Extended Service Set (ESS for short) can be constituted. The multiple STAs can also constitute a self-organization WLAN, which is referred to as an Independent BSS (IBSS). The STAs in the IBSS can communicate with each other directly.

In the 802.11, an Access Point (AP for short) and multiple Stations (STAs for short) associated with the AP constitute a Basic Service Set (BSS for short). The 802.11 defines two operating modes: Distributed Coordination Function (DCF for short) and Point Coordination Function (PCF for short), and the improvements for the two operating modes: Enhanced Distributed Channel Access (EDCA for short) and Hybrid Coordination Function Controlled Channel Access (HCCA for short). Wherein, the DCF is the most basic operating mode, which enables multiple STAs to share a wireless channel using a Carrier Sense Multiple Access with Collision Avoidance (CSMA/CA) mechanism. The EDCA is an enhanced operating mode, which maps the upper layer data into four different Access Categories (ACs): AC_VO, AC_VI, AC_BE and AC_BK, wherein, each access category distinguishes between priorities using parameters of different competition channels. With the CSMA/CA mechanism, the EDCA enables accesses with different priorities to share a wireless channel, and reserves a Transmission Opportunity (TXOP for short). A basic process of accesses with different priorities obtaining transmission opportunities is that when each access is idle in the channel, the channel is accessed using different backoff intervals plus any competition backoff window, to reduce collision.

When the multiple wireless STAs share a channel, it becomes very difficult to detect collision in a wireless environment, in which a serious problem is hidden STAs. As shown in FIG. 1, STA A transmits data to STA B, and STA C also transmits data to STA B at the same time. Because the STA C and the STA A are within a coverage of each other, simultaneous transmission of the STA A and the STA C will result in conflict. From the perspective of the STA A, the STA C is a hidden STA. In order to solve the problem of the hidden STA, the 802.11 proposes a virtual channel detection mechanism, i.e., collision with the hidden STA is avoided by means of including channel reservation time information in a frame header of a radio frame. Other STAs receiving the radio frame with reservation time information set a Network Allocation Vector (NAV) stored locally. A value of the NAV is set as a maximum value of the above channel reservation time information and reserved time information. In this period of time, the other STA will not transmit data, thereby avoiding the problem of the hidden STA competing for a channel which results in collision. Only after the NAV is reduced to zero, other STAs will transmit data. Before large data are transmitted, a transmitting party can firstly transmit a Request to send (RTS) for channel reservation, which includes channel reservation time information. A receiving party responds with Clear to send (CTS) to make a channel reservation acknowledge, which also includes channel reservation time information, to protect radio frames transmitted subsequently by the transmitting party, and FIG. 2 can be referred to for a specific process.

The IEEE 802.11 defines two modes of energy management: an Active Mode (AM) and a Power Saving Mode (PS). For an STA in a power saving mode, the AP carries traffic indication information in a Beacon transmitted periodically, i.e., a Traffic Indication Map (TIM for short) information element, which notifies whether these STAs in a power saving mode have bufferable units to be transmitted. If it finds that these STAs have bufferable units, the STAs will transmit a Power Saving frame (PS-Poll), and the AP can respond with an Acknowledgement (ACK) frame or can also directly respond with a data frame. An STA which sleeps for a long time awakes, and actively transmits the PS-Poll frame, and the AP responds by transmitting an ACK carrying an indication of whether there is downlink traffic or directly transmitting a data frame.

For an application scenario with a large coverage and multiple STAs, the number of STAs which can not be listened for each other will increase, and the problem of the hidden STAs will become more obvious. If a frame responded by an AP is long after the STA transmits the PS-Poll frame, the time for transmitting the frame will be long. At the STA side, an STA which can not receive the response from the AP will judge that the channel is empty, compete for a channel and transmit data, which results in collision at the STA side which transmits the PS-Poll.

SUMMARY OF THE INVENTION

The embodiments of the present document provide a method for avoiding downlink data collision, an access point and a station, to solve a problem of collision at the STA side when an AP responds with a long frame after an STA transmits a PS-Poll frame.

The embodiments of the present document provide a method for avoiding downlink data collision, comprising:

an Access point (AP) receiving a radio frame for inquiring whether the AP has a Bufferable Unit (BU) of a Station (STA) transmitted by the STA; and after determining that there is a BU of the STA and the BU is larger than a predetermined threshold, the AP exchanging radio frames with the STA to reserve a channel, and transmitting the BU to the STA after succeeding in reserving the channel.

The predetermined threshold is a value negotiated by the AP and the STA in an association process or a re-association process, or a value indicated by a capability information element of a broadcast frame initiated by the AP, or a value indicated during capability negotiation by the AP and the STA, or a value default in a system where the AP is located.

The step of the AP exchanging radio frames with the STA to reserve a channel, and transmitting the BU to the STA after succeeding in reserving the channel comprises:

the AP transmitting a Request to send (RTS) frame to the STA to reserve the channel; and the AP transmitting the BU to the STA after receiving a Clear to send (CTS) frame returned by the STA;

wherein, a channel reservation time included in the RTS frame is set as a sum of a transmission time of one or more BUs to be transmitted, a required response time, and an inter-frame space between a radio frame where the BU(s) is located and a radio frame where the response is located, the response includes an instant response and/or a delay response, and a time cut-off point of the channel reservation time included in the CTS frame and a time cut-off point of the channel reservation time included in the RTS frame are the same.

The embodiments of the present document provide a method for avoiding downlink data collision, comprising:

a Station (STA) in a power saving mode transmitting a radio frame for inquiring whether an Access Point (AP) has a Bufferable Unit (BU) of the STA to the AP; and the STA cooperating with the AP to complete exchanging radio frames to reserve a channel, and receiving the BU transmitted by the AP via a successfully reserved channel.

The step of the STA transmitting a radio frame to the AP comprises:

the STA actively transmitting the radio frame to the AP; or after periodically listening for traffic indication information transmitted by the AP, the STA transmitting the radio frame to the AP.

A total transmission duration of a frame exchange sequence transmitted by the STA beginning from the radio frame in an obtained transmission opportunity is limited by an attribute of the STA.

The attribute of the STA includes an access category parameter corresponding to the radio frame.

The total transmission duration is a sum of a total time of the radio frame transmitted by the STA, a total time of the radio frame transmitted by the AP, and an inter-frame space between the radio frame transmitted by the STA and the radio frame transmitted by the AP.

The embodiments of the present document provide an access Point (AP), comprising:

a receiving module, configured to receive a radio frame for inquiring whether the AP has a Bufferable Unit (BU) of a Station (STA) transmitted by the STA; and a processing module, configured to after determining that the AP has a BU of the STA and the BU is larger than a predetermined threshold, exchange radio frames with the STA to reserve a channel, and transmit the BU to the STA after succeeding in reserving the channel.

The predetermined threshold is a value negotiated by the AP and the STA in an association process or a re-association process, or a value indicated by a capability information element of a broadcast frame initiated by the AP, or a value indicated during capability negotiation by the AP and the STA, or a value default in a system where the AP is located.

The processing module is configured to transmit a Request to send (RTS) frame to the STA to reserve the channel; and transmit the BU to the STA after receiving a Clear to send (CTS) frame returned by the STA; wherein, a channel reservation time included in the RTS frame is set as a sum of a transmission time of one or more BUs to be transmitted, a required response time, and an inter-frame space between a radio frame where the BU(s) is located and a radio frame where the response is located, the response includes an instant response and/or a delay response, and a time cut-off point of the channel reservation time included in the CTS frame and a time cut-off point of the channel reservation time included in the RTS frame are the same.

The embodiments of the present document provide a Station (STA), comprising:

a transmitting module, configured to transmit a radio frame for inquiring whether an Access Point (AP) has a Bufferable Unit (BU) of the STA to the AP; and a processing module, configured to cooperate with the AP to complete exchanging radio frames to reserve a channel, and receive the BU transmitted by the AP via a successfully reserved channel.

The transmitting module is configured to actively transmit the radio frame to the AP; or transmit the radio frame to the AP after periodically listening for traffic indication information transmitted by the AP.

A total transmission duration of a frame exchange sequence transmitted by the STA beginning from the radio frame in an obtained transmission opportunity is limited by an attribute of the STA.

The attribute of the STA includes an access category parameter corresponding to the radio frame.

The total transmission duration is a sum of a total time of the radio frame transmitted by the STA, a total time of the radio frame transmitted by the AP, and an inter-frame space between the radio frame transmitted by the STA and the radio frame transmitted by the AP.

The above transmission method for avoiding downlink data collision can guarantee the fairness among various STAs and the reasonable utilization of channel resources, thus avoiding the collision; furthermore, after PS-Poll, the AP transmits a channel reservation frame, for example, a RTS frame, which can reserve a longer period of time, i.e., multiple BUs can be transmitted to the STA at a time, without the need of transmitting PS-Poll for each BU, thereby saving the link overhead.

PREFERRED EMBODIMENTS OF THE INVENTION

Figure 1:
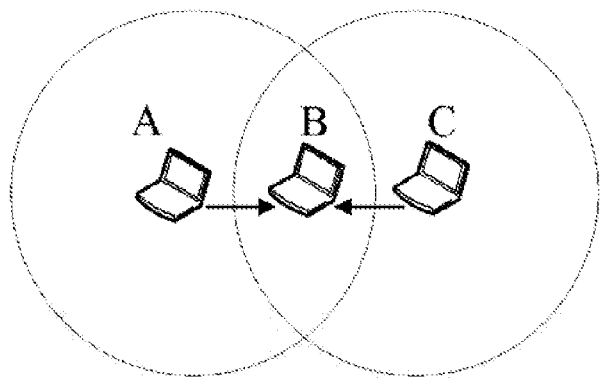
FIG. 1 is a diagram of an existing hidden STA.
Figure 2:
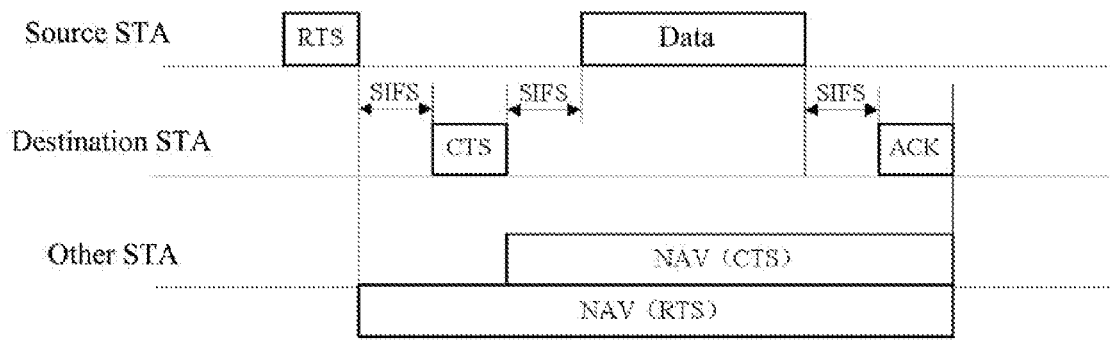
FIG. 2 is a diagram of solving a problem of a hidden STA in the related art.

In order to make the purpose, technical solutions and advantages of the present document more clear and apparent, the embodiments of the present document will be illustrated in detail hereinafter in conjunction with accompanying drawings. It should be illustrated that, in the case of no conflict, the embodiments of this application and the features in the embodiments could be combined randomly with each other.

The embodiments of the present document provide a method for avoiding downlink data collision, which is described from perspective of an STA. The method includes the following steps.

In step one, an STA in a power saving mode transmits a radio frame for inquiring whether an AP has a Bufferable Unit (BU) of the STA to the AP;

The step may include: the STA actively transmitting the radio frame to the AP; or after periodically listening for traffic indication information transmitted by the AP, the STA transmitting the radio frame to the AP.

In step two, the STA cooperates with the AP to complete exchanging radio frames to reserve a channel, and receives the BU transmitted by the AP via a successfully reserved channel.

A total transmission duration of a frame exchange sequence transmitted by the STA beginning from the radio frame in an obtained transmission opportunity is limited by an attribute of the STA; wherein, the attribute of the STA includes an access category parameter corresponding to the radio frame; and the total transmission duration is a sum of a total time of the radio frame transmitted by the STA, a total time of the radio frame transmitted by the AP, and an inter-frame space between the radio frame transmitted by the STA and the radio frame transmitted by the AP.

In the above method for avoiding downlink data collision, the base station cooperates with the AP to complete reserving a channel, so that it becomes possible to avoid collision at the STA side.

The embodiments of the present document further provide a method for avoiding downlink data collision, which is described from the perspective of an AP. The method includes the following steps.

in step one, an AP receives a radio frame for inquiring whether the AP has a Bufferable Unit (BU) of an STA transmitted by the STA; and in step two, after determining that there is the BU of the STA and the BU is larger than a predetermined threshold, the AP exchanges radio frames with the STA to reserve a channel, and transmits the BU to the STA after succeeding in reserving the channel.

Wherein, the predetermined threshold is a value negotiated by the AP and the STA in an association process or a re-association process, or a value indicated by a capability information element of a broadcast frame initiated by the AP, or a value indicated during capability negotiation by the AP and the STA, or a value default in a system where the AP is located.

The step may include: the AP transmitting a RTS frame to the STA to reserve the channel; and the AP transmitting the BU to the STA after receiving a CTS frame returned by the STA; wherein, a channel reservation time included in the RTS frame is set as a sum of a transmission time of one or more BUs to be transmitted, a required response time, and an inter-frame space between a radio frame where the BU(s) is located and a radio frame where the response is located, the response includes an instant response and/or a delay response, and a time cut-off point of the channel reservation time included in the CTS frame and a time cut-off point of the channel reservation time included in the RTS frame are the same.

In the above method for avoiding downlink data collision, the AP reserves a channel with the STA when it is determined that the buffered data is larger than a predetermined threshold, so that the channel becomes a dedicated channel between the AP and the STA, thereby avoiding collision; moreover, after PS-Poll, the AP transmits a channel reservation frame, for example, a RTS frame, which can reserve a longer period of time, i.e., multiple BUs can be transmitted to the STA at a time, without the need of transmitting PS-Poll for each BU, thereby saving the link overhead.

The technical solutions of the present document will be described in detail below from perspectives from an AP and an STA.

Embodiment One

The present embodiment is an embodiment using a transmission method for avoiding downlink data collision according to the present document. In the present embodiment, the implementation of downlink data transmission primarily includes the following steps.

An STA notifies the above predetermined threshold or negotiates the above predetermined threshold with an AP in an association process.

The STA in a power saving mode actively awakes, transmits a PS-Poll frame, and inquires whether the AP has a BU of the STA; and after receiving the PS-Poll transmitted by the STA in the PS mode, the AP makes a response according to a condition of the BU of the STA:

When the AP does not have the BU of the STA, the AP transmits an ACK indicating that there is no BU. When the AP has the BU of the STA, the AP responds with an ACK indicating that there is a BU, or when the BU is less than the threshold value negotiated above, the AP can directly respond with the BU, or when the BU is larger than the threshold value negotiated above, the AP firstly transmits a RTS to reserve a channel, wherein, the channel reservation time of the RTS is set to a time required for transmitting data.

Figure 3:
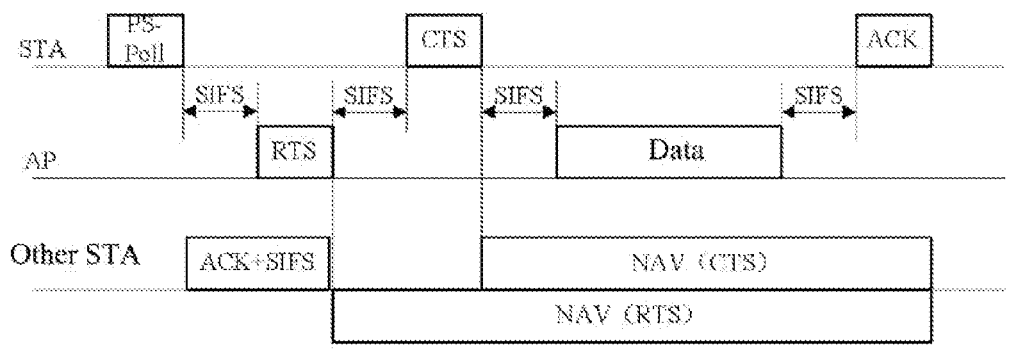
FIG. 3 is a diagram of embodiment one of a method for avoiding downlink data collision according to the present document.

When the STA which transmits the PS-Poll receives the RTS frame, the STA will respond with a CTS frame after a Short Inter Frame Space (SIFS), wherein, a time cut-off point set through the channel reservation time of the CTS is consistent with a cut-off point set through the channel reservation information of the RTS. At the SIFS after receiving the CTS frame, the AP will transmit the BU, and if the BU needs to be responded immediately, the STA will make a response, as shown in FIG. 3.

If the STA does not detect any signal for a period of time after transmitting the PS-Poll frame, or receives an error frame, the STA re-competes for a channel.

Figure 4:
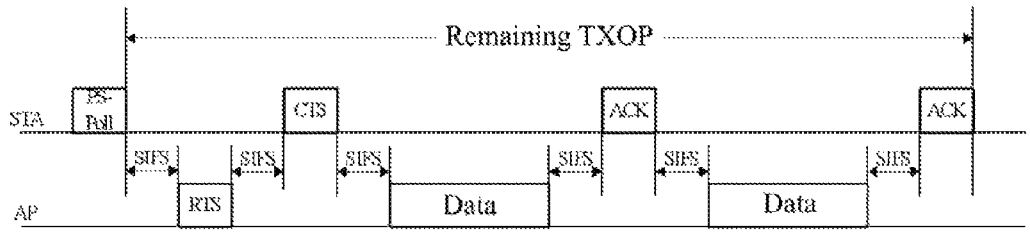
FIG. 4 is diagram one of a total frame transmission duration according to the present document.

After the AP receives the PS-Poll successfully, if the transmitted BU exceeds the predetermined threshold value, the AP transmits a RTS frame to reserve a channel. If a correct CTS is received after the SIFS, one BU is responded after the SIFS. After the SIFS, one ACK is received successfully, and the BUs of the STA can continuously be transmitted subsequently. However the whole transmission time (including the PS-Poll) can not exceed a TXOP Limit for Avoiding Collision (AC) corresponding to the PS-Poll. As shown in FIG. 4, if the TXOP Limit for the AC corresponding to the PS-Poll is 0, only a frame exchange sequence needed by one BU can be transmitted.

An other STA which receives the PS-Poll updates a NAV in accordance with the SIFS plus an ACK transmission time. The other STA receives the RTS frame successfully and updates the NAV, and if no channel is detected during a period of time, the NAV will be reset.

Embodiment Two

In the present embodiment, the above predetermined threshold is configured using a system default parameter.

The STA in a power saving mode actively awakes, transmits a PS-Poll frame, and inquires whether the AP has a BU of the STA. After receiving the PS-Poll transmitted by the STA in the PS mode, the AP makes a response according to a condition of the BU of the STA:

When the AP does not have the BU of the STA, the AP transmits an ACK indicating that there is no BU. When the AP has the BU of the STA, the AP responds with an ACK indicating that there is a BU, or when the BU is less than the threshold value negotiated above, the AP can directly respond with the BU, or when the BU is larger than the threshold value negotiated above, the AP firstly transmits a RTS to reserve a channel, wherein, the channel reservation time of the RTS is set to a time required for transmitting data.

When the STA which transmits the PS-Poll receives the RTS frame, the STA will respond with a CTS frame after a Short Inter Frame Space (SIFS), wherein, a time cut-off point set through the channel reservation time of the CTS is consistent with a cut-off point set through the channel reservation information of the RTS. At the SIFS after receiving the CTS frame, the AP will transmit the BU, and if the BU needs to be responded immediately, the STA will make a response.

If the STA does not detect any signal for a period of time after transmitting the PS-Poll frame, or receives an error frame, the STA re-competes for a channel.

Figure 5:
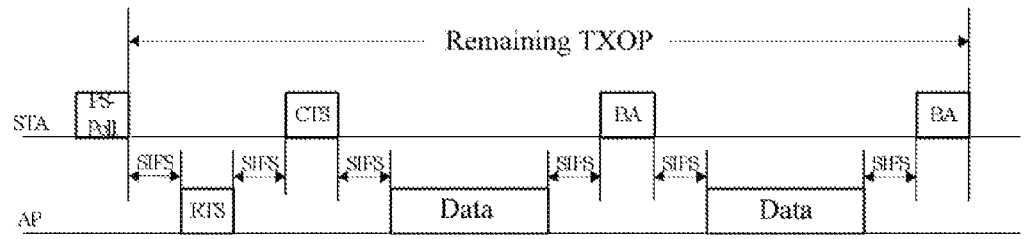
FIG. 5 is diagram two of a total frame transmission duration according to the present document.

After the AP receives the PS-Poll successfully, if the transmitted BU exceeds the predetermined threshold value, the AP transmits a RTS frame to reserve a channel. If a correct CTS is received after the SIFS, one BU is responded after the SIFS. After the SIFS, if one Block Acknowledgment (BA) is received successfully, the BU of the STA can continuously be transmitted subsequently. However the whole transmission time (including the PS-Poll) can not exceed a TXOP Limit for Avoiding Collision (AC) corresponding to the PS-Poll. As shown in FIG. 5, if the TXOP Limit for the AC corresponding to the PS-Poll is 0, only a frame exchange transmission of one BU can be transmitted.

An other STA which receives the PS-Poll updates a NAV in accordance with the SIFS plus an ACK transmission time. The other STA receives the RTS frame successfully and updates the NAV, and if no channel is detected during a period of time, the NAV will be reset.

Embodiment Three

The present embodiment is an embodiment using a transmission method for avoiding downlink data collision according to the present document. In the present embodiment, the implementation of downlink data transmission primarily includes the following steps.

In the present embodiment, an STA notifies the above predetermined threshold or negotiates the above predetermined threshold with an AP in an association process.

The STA in a power saving mode periodically awakes, listens for a traffic indication in the Beacon, and if it finds that the AP has a BU of its own, it will transmits a PS-Poll frame through competition; and after receiving the PS-Poll transmitted by the STA in the PS mode, the AP makes a response according to a condition of the BU of the STA:

When the AP does not have the BU of the STA, the AP transmits an ACK indicating that there is no BU. When the AP has the BU of the STA, the AP responds with an ACK indicating that there is a BU, or when the BU is less than the threshold value negotiated above, the AP can directly respond with the BU, or when the BU is larger than the threshold value negotiated above, the AP firstly transmits a RTS to reserve a channel, wherein, the channel reservation time of the RTS is set to a time required for transmitting data.

When the STA which transmits the PS-Poll receives the RTS frame, the STA will respond with a CTS frame after a Short Inter Frame Space (SIFS), wherein, a time cut-off point set through the channel reservation time of the CTS is consistent with a cut-off point set through the channel reservation information of the RTS. At the SIFS after receiving the CTS frame, the AP will transmit the BU, and if the BU needs to be responded immediately, the STA will make a response, as shown in FIG. 3.

If the STA does not detect any signal for a period of time after transmitting the PS-Poll frame, or receives an error frame, the STA re-competes for a channel.

After the AP receives the PS-Poll successfully, if the transmitted BU exceeds the predetermined threshold value, the AP transmits a RTS frame to reserve a channel. If a correct CTS is received after the SIFS, one BU is responded after the SIFS. After the SIFS, if one ACK is received successfully, the BU of the STA can continuously be transmitted subsequently. However the whole transmission time (including the PS-Poll) can not exceed a TXOP Limit for Avoiding Collision (AC) corresponding to the PS-Poll. As shown in FIG. 4, if the TXOP Limit for the AC corresponding to the PS-Poll is 0, only a frame exchange transmission of one BU can be transmitted.

An other STA which receives the PS-Poll updates a NAV in accordance with the SIFS plus ACK transmission time. The other STA receives the RTS frame successfully and updates the NAV, and if no channel is detected during a period of time, the NAV will be reset.

Embodiment Four

In the present embodiment, an STA notifies the above predetermined threshold or negotiates the above predetermined threshold with an AP in an association process.

The STA in a power saving mode actively awakes, transmits a PS-Poll frame, and inquires whether the AP has a BU of the STA. After receiving the PS-Poll transmitted by the STA in the PS mode, the AP makes a response according to a condition of the BU of the STA:

When the AP does not have the BU of the STA, the AP transmits an ACK indicating that there is no BU. When the AP has the BU of the STA, the AP responds with an ACK indicating that there is a BU, or when the BU is less than the threshold value negotiated above, the AP can directly respond with the BU, or when the BU is larger than the threshold value negotiated above, the AP firstly transmits a RTS to reserve a channel.

Figure 6:
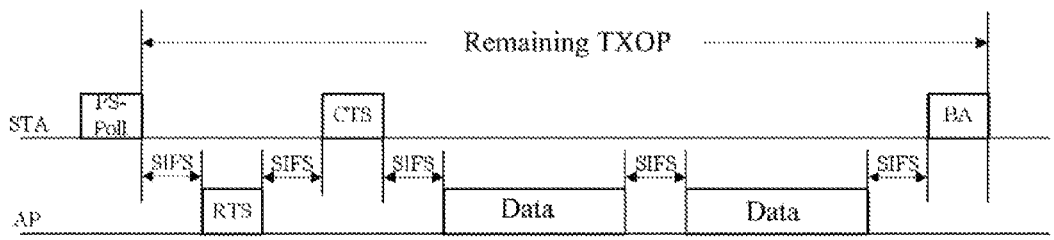
FIG. 6 is a diagram of embodiment two of a method for avoiding downlink data collision according to the present document.

When the STA which transmits the PS-Poll receives the RTS frame, the STA will respond with a CTS frame after a Short Inter Frame Space (SIFS), wherein, a time cut-off point set through the channel reservation time of the CTS is consistent with a cut-off point set through the channel reservation information of the RTS. At the SIFS after receiving the CTS frame, the AP will transmit the BU. When a BU response mechanism is set as a delay response, the AP will continue to transmit data after the SIFS, as shown in FIG. 6.

If the STA does not detect any signal for a period of time after transmitting the PS-Poll frame, or receives an error frame, the STA re-competes for a channel.

After the AP receives the PS-Poll successfully, if the transmitted BU exceeds the predetermined threshold value, the AP transmits a RTS frame to reserve a channel. If a correct CTS is received after the SIFS, one BU is responded after the SIFS. After the SIFS, the BU of the STA continues to be transmitted. However the whole transmission time (including the PS-Poll) can not exceed a TXOP Limit for Avoiding Collision (AC) corresponding to the PS-Poll. If the TXOP Limit for the AC corresponding to the PS-Poll is 0, only a frame exchange transmission of one BU can be transmitted.

An other STA which receives the PS-Poll updates a NAV in accordance with the SIFS plus ACK transmission time. The other STA receives the RTS frame successfully and updates the NAV, and if no channel is detected during a period of time, the NAV will be reset.

Figure 7:
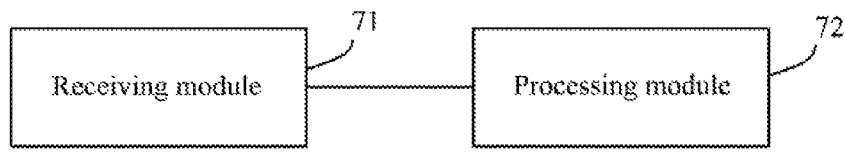
FIG. 7 is a structural diagram of an embodiment of an AP according to the present document.

As shown in FIG. 7, a structural diagram of an embodiment of an AP according to the present document is illustrated. The AP includes a receiving module 71 and a processing module 72, wherein, a receiving module 71 is configured to receive a radio frame for inquiring whether the AP has a BU of an STA transmitted by the STA; and a processing module 72 is configured to after determining that the AP has the BU of the STA and the BU is larger than a predetermined threshold, exchange radio frames with the STA to reserve a channel, and transmit the BU to the STA after succeeding in reserving the channel.

Wherein, the predetermined threshold is a value negotiated by the AP and the STA in an association process or a re-association process, or a value indicated by a capability information element of a broadcast frame initiated by the AP, or a value indicated during capability negotiation by the AP and the STA, or a value default in a system where the AP is located.

In addition, the processing module 72 is configured to transmit a RTS frame to the STA to reserve the channel; and transmit the BU to the STA after receiving a CTS frame returned by the STA; wherein, channel reservation time included in the RTS frame is set as a sum of a transmission time of one or more BUs to be transmitted, a required response time, and an inter-frame space between a radio frame where the BU(s) is located and a radio frame where the response is located, the response includes an instant response and/or a delay response, and a time cut-off point of the channel reservation time included in the CTS frame and a time cut-off point of the channel reservation time included in the RTS frame are the same.

The above AP reserves a channel with the STA when determining that the buffered data is larger than the predetermined threshold, so that the channel becomes a dedicated channel between the AP and the STA, thereby avoiding the collision; furthermore, the AP can transmit a channel reservation frame, for example a RTS frame, which can reserve a longer period of time, i.e. a plurality of BUs can be transmitted to the STA at a time, thus saving the link overhead.

Figure 8:
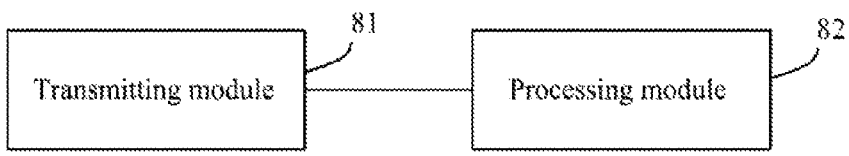
FIG. 8 is a structural diagram of an embodiment of an STA according to the present document.

As shown in FIG. 8, a structural diagram of an embodiment of an STA according to the present document is illustrated. The STA includes a transmitting module 81 and a processing module 82, wherein, a transmitting module 81 is configured to transmit a radio frame for inquiring whether an AP has a BU of the STA to the AP; and a processing module 82 is configured to cooperate with the AP to complete exchanging radio frames to reserve a channel, and receive the BU transmitted by the AP via a successfully reserved channel.

Wherein, the transmitting module 81 is configured to actively transmit the radio frame to the AP; or transmit the radio frame to the AP after periodically listening for traffic indication information transmitted by the AP.

A total transmission duration of a frame exchange sequence transmitted by the STA beginning from the radio frame in an obtained transmission opportunity is limited by an attribute of the STA; wherein, the attribute of the STA includes an access category parameter corresponding to the radio frame; and the total transmission duration is a sum of a total time of the radio frame transmitted by the STA, a total time of the radio frame transmitted by the AP, and an inter-frame space between the radio frame transmitted by the STA and the radio frame transmitted by the AP.

The above STA cooperates with the AP to complete reserving a channel, so that it becomes possible to avoid collision at the STA side.

A person having ordinary skill in the art can understand that all or part of steps in the above method can be implemented by programs instructing related hardware, which can be stored in a computer readable storage medium, such as a read-only memory, a disk or a disc etc. Alternatively, all or part of steps in the above embodiments can also be implemented by one or more integrated circuits. Accordingly, each module/unit in the above embodiments can be implemented in the form of hardware, or can also be implemented in the form of software functional module. The present document is not limited to any particular form of a combination of hardware and software.

The above embodiments are only used to illustrate technical solutions of the present document without limitation, and the present document is merely described in detail with reference to preferred embodiments. Those of ordinary skill in the art should understand that modifications or equivalent substitutions can be made on the technical solutions of the present document without departing from the spirit and scope of the technical solutions of the present document, all of which should be contained within the scope of the claims of the present document.

INDUSTRIAL APPLICABILITY

The above transmission method for avoiding downlink data collision can guarantee the fairness among various STAs and the reasonable utilization of channel resources, thus avoiding the collision; furthermore, after PS-Poll, the AP transmits a channel reservation frame, for example, a RTS frame, which can reserve a longer period of time, i.e., multiple BUs can be transmitted to the STA at a time, without the need of transmitting PS-Poll for each BU, thereby saving the link overhead.

What is claimed is:

1. A method for avoiding downlink data collision, comprising:
    an Access point (AP) receiving a radio frame (PS-Poll) transmitted by a Station (STA) for inquiring whether the AP has one or more Bufferable Units (BUs) to be transmitted to the STA;
    when the AP determines that there is one or more BUs to be transmitted to the STA and a length of the one or more BUs is larger than a predetermined threshold, the AP transmitting to the STA a Request to send (RTS) frame to reserve a channel with a first channel reservation time required for transmitting data, then the AP receiving a Clear to send (CTS) frame with a second channel reservation time transmitted by the STA after the STA which transmits the PS-Poll receives the RTS frame, and the AP transmitting the one or more BUs to the STA after succeeding in reserving the channel;

wherein a time cut-off point set through the first channel reservation time of the RTS frame is consistent with a cut-off point set through the second channel reservation information of the CTS frame.

2. The method according to claim 1, wherein,
the predetermined threshold is a value negotiated by the AP and the STA in an association process or a re-association process, or a value indicated by a capability information element of a broadcast frame initiated by the AP, or a value indicated during capability negotiation by the AP and the STA, or a value default in a system where the AP is located.

3. The method according to claim 1,
wherein, the first channel reservation time of the RTS frame is set as a sum of a transmission time of the one or more BUs to be transmitted, a required response time, and an inter-frame space between a radio frame where the BU(s) is located and a radio frame where the response is located.

4. A method for avoiding downlink data collision, comprising:
a Station (STA) in a power saving mode transmitting a radio frame (PS-Poll) to an Access Point (AP) for inquiring whether the AP has one or more Bufferable Units (BUs) to be transmitted to the STA; and
the STA receiving a Request to send (RTS) frame with a first channel reservation time required for transmitting data from the AP and then transmitting a Clear to send (CTS) frame with a second channel reservation time to the AP to cooperate with the AP to reserve a channel, and receiving the one or more BUs transmitted by the AP via a successfully reserved channel;
wherein a time cut-off point set through the first channel reservation time of the RTS frame is consistent with a cut-off point set through the second channel reservation information of the CTS frame.

5. The method according to claim 4, wherein,
the step of the STA transmitting a radio frame to the AP comprises:
the STA actively transmitting the radio frame to the AP; or
after periodically listening for traffic indication information transmitted by the AP, the STA transmitting the radio frame to the AP.

6. The method according to claim 5, wherein,
a total transmission duration of a frame exchange sequence transmitted by the STA beginning from the radio frame in an obtained transmission opportunity is limited by an attribute of the STA.

7. The method according to claim 4, wherein,
a total transmission duration of a frame exchange sequence transmitted by the STA beginning from the radio frame in an obtained transmission opportunity is limited by an attribute of the STA.

8. The method according to claim 7, wherein,
the attribute of the STA includes an access category parameter corresponding to the radio frame.

9. The method according to claim 7, wherein,
the total transmission duration is a sum of a total time of the radio frame transmitted from the STA to the AP, a total time of the radio frame transmitted from the AP to the STA, and an inter-frame space between the radio frame transmitted by the STA and the radio frame transmitted by the AP.

10. An access Point (AP), comprising:
a receiving module, configured to receive a radio frame (PS-Poll) transmitted by a Station (STA) for inquiring whether the AP has one or more Bufferable Unit (BU) to be transmitted to the STA; and
a processing module, configured to, when determining that the AP has one or more BUs to be transmitted to the STA and a length of the one or more BUs is larger than a predetermined threshold, transmit to the STA a Request to send (RTS) frame to reserve a channel with a first channel reservation time required for transmitting data, then receive a Clear to send (CTS) frame with a second channel reservation time transmitted by the STA after the STA which transmits the PS-Poll receives the RTS frame, and transmit the one or more BUs to the STA after succeeding in reserving the channel;
wherein a time cut-off point set through the first channel reservation time of the RTS frame is consistent with a cut-off point set through the second channel reservation information of the CTS frame.

11. The AP according to claim 10, wherein,
the predetermined threshold is a value negotiated by the AP and the STA in an association process or a re-association process, or a value indicated by a capability information element of a broadcast frame initiated by the AP, or a value indicated during capability negotiation by the AP and the STA, or a value default in a system where the AP is located.

12. The AP according to claim 10, wherein,
the first channel reservation time of the RTS frame is set as a sum of a transmission time of the one or more BUs to be transmitted, a required response time, and an inter-frame space between a radio frame where the BU(s) is located and a radio frame where the response is located.

13. A Station (STA), comprising:
a transmitting module, configured to transmit a radio frame (PS-Poll) to an Access Point (AP) for inquiring whether the AP has one or more Bufferable Units (BUs) to be transmitted to the STA; and
a processing module, configured to receive a Request to send (RTS) frame with a first channel reservation time required for transmitting data from the AP and then transmit a Clear to send (CTS) frame with a second channel reservation time to the AP to cooperate with the AP to reserve a channel, and receive the one or more BUs transmitted by the AP via a successfully reserved channel;
wherein a time cut-off point set through the first channel reservation time of the RTS frame is consistent with a cut-off point set through the second channel reservation information of the CTS frame.

14. The STA according to claim 13, wherein,
the transmitting module is configured to actively transmit the radio frame to the AP; or transmit the radio frame to the AP after periodically listening for traffic indication information transmitted by the AP.

15. The STA according to claim 14, wherein,
a total transmission duration of a frame exchange sequence transmitted by the STA beginning from the radio frame in an obtained transmission opportunity is limited by an attribute of the STA.

16. The STA according to claim 13, wherein,
a total transmission duration of a frame exchange sequence transmitted by the STA beginning from the radio frame in an obtained transmission opportunity is limited by an attribute of the STA.

17. The STA according to claim 16, wherein,
the attribute of the STA includes an access category parameter corresponding to the radio frame.

18. The STA according to claim 16, wherein,
the total transmission duration is a sum of a total time of the radio frame transmitted from the STA to the AP, a total time of the radio frame transmitted from the AP to the STA, and an inter-frame space between the radio frame transmitted by the STA and the radio frame transmitted by the AP.

* * * * *